United States Patent [19]

Jones

[11] Patent Number: 4,764,837
[45] Date of Patent: Aug. 16, 1988

[54] SUPERCONDUCTIVE CIRCUIT FOR CONTROLLING QUENCH EVENTS

[75] Inventor: Donald W. Jones, Burnt Hills, N.Y.

[73] Assignee: General Electric Company, Schenectady, N.Y.

[21] Appl. No.: 120,910

[22] Filed: Nov. 16, 1987

[51] Int. Cl.$^4$ .............................................. H02H 9/00
[52] U.S. Cl. ..................... 361/19; 361/141; 323/360; 307/245; 307/306
[58] Field of Search .................. 323/355, 360; 361/19, 361/141; 307/245, 306; 363/14; 338/325

[56] References Cited

U.S. PATENT DOCUMENTS

| | | | |
|---|---|---|---|
| 3,466,504 | 9/1969 | Hart, Jr. | 361/19 |
| 4,459,495 | 7/1984 | Gheewala | 323/360 |
| 4,559,576 | 12/1985 | Ries | 361/19 |
| 4,568,908 | 2/1986 | Laskaris et al. | 338/280 |
| 4,586,017 | 4/1986 | Laskaris et al. | 361/19 |
| 4,680,666 | 7/1987 | Rios | 363/141 |

Primary Examiner—Peter S. Wong
Attorney, Agent, or Firm—William H. Steinberg; James C. Davis, Jr.; Paul R. Webb, II

[57] ABSTRACT

A circuit is provided comprising a plurality of series connected superconductive coils. Each of a plurality of series connected shunt resistors is connected in parallel with at least one corresponding series connected superconductive coil. A superconductive switch, which includes a length of superconductive wire, is connected in parallel with the series connected superconductive coils. The switch further includes a first and second heater means which are thermally coupled to the superconductive wire. The first heater means is connectable to an external power supply. The second heater means has a plurality of different sections with each of the shunt resistors connected in parallel to one of the sections so that a quench in any of the superconductive coils causes a section of the second heater means to warm and drive the superconductive switch normal.

3 Claims, 3 Drawing Sheets

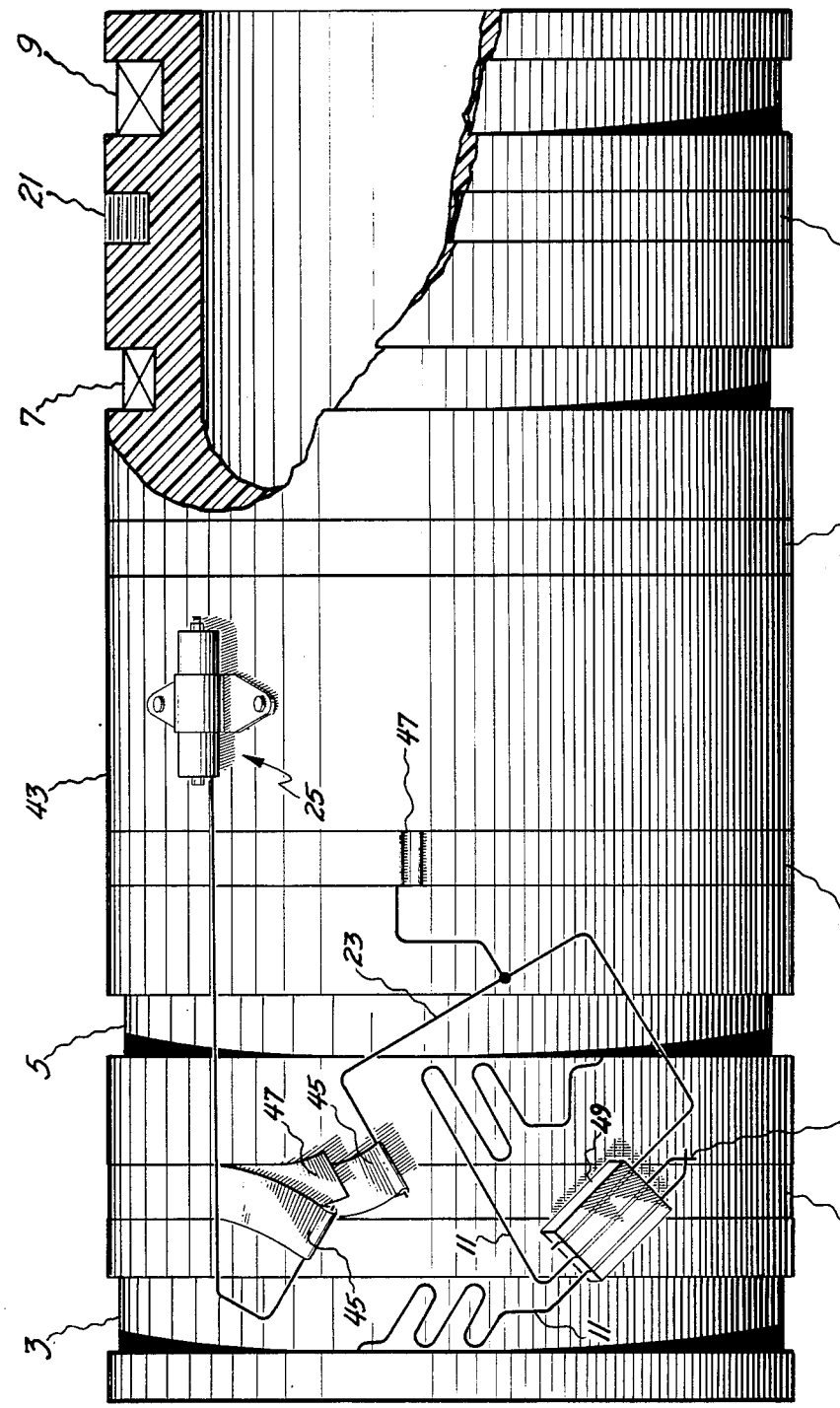

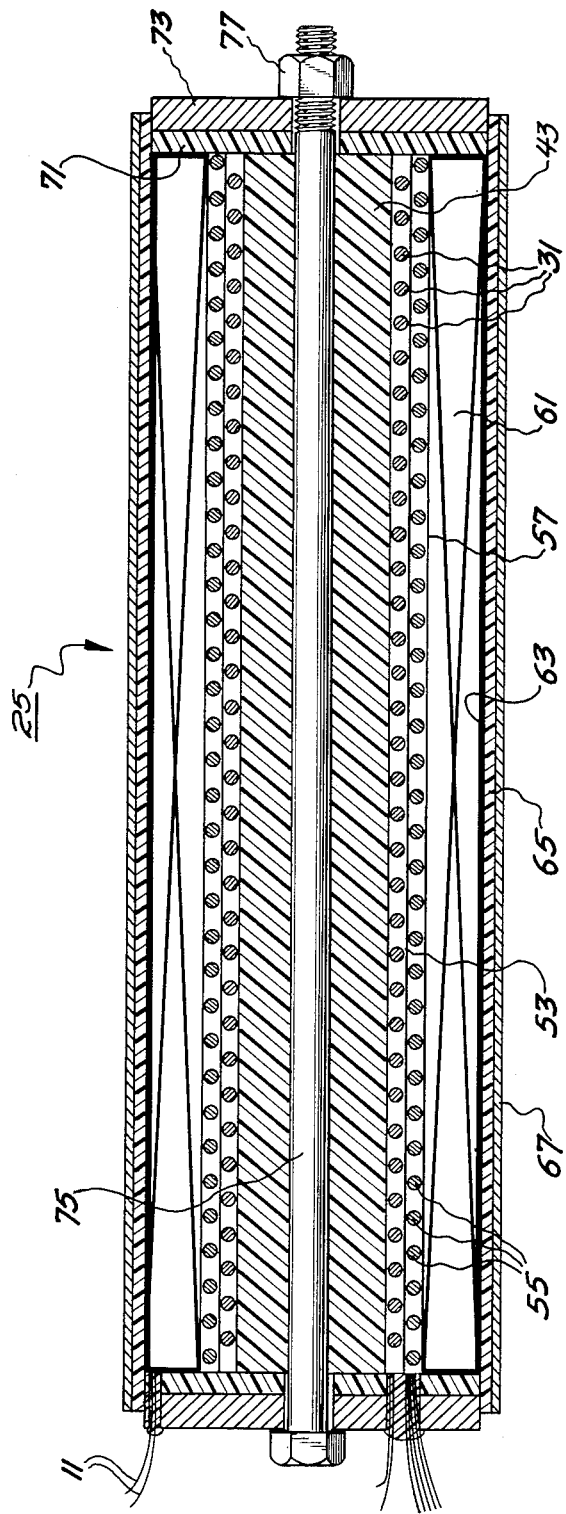

SUPERCONDUCTIVE CIRCUIT FOR CONTROLLING QUENCH EVENTS

BACKGROUND OF THE INVENTION

The present invention relates to circuits containing superconductive electrical switches used for interrupting persistent current flow in superconducting loops and also containing shunt resistors used to protect superconductive coils during quench events.

In superconductive electrical systems operating with a persistent current loop, current flows through superconducting coils and a superconducting switch. Interruption of current flow is accomplished by applying power to a superconducting switch in which a heater heats a portion of superconducting wire above its transition temperature, causing the superconducting switch to go normal. As the superconductive switch heats further, due to the $I^2R$ power dissipation, where I is the current and R the resistance in the circuit, the resistance of the switch rises and therefore the voltage drop across the switch increases. To avoid having to dissipate all the stored magnetic energy of the superconducting coils in the switch, which would require a massive switch to limit the switch's temperature rise to an acceptable value to avoid superconductor wire damage, a string of shunt resistors is provided with a shunt resistor in parallel with each superconductive coil. As the resistance of the superconductive switch climbs with temperature, the voltage induced in each of the superconducting coils due to the L di/dt drop across the coil, where L is the inductance of the coil and di/dt the rate of change of the current through the coil, causes the power dissipation in the circuit to be shared by the superconductive switch and the shunt resistors. With proper sizing of the shunt resistors, the circuit can be designed to dissipate the bulk of the energy in the shunt resistors. With the resistance of each resistor in parallel with the coil made proportional to the coil inductance, the voltage drops across each resistor will exactly match the voltages across the coil sections when the same current flows through each resistor. Thus, with the same current flowing in each resistor section, the $I^2R$ energy dissipation in each will be proportional to their resistance, and if their thermal masses are proportional to their resistances, the temperature rise of each resistor section will be identical with time.

However, if a quench of the superconductor initiates in one of the coils rather than in the switch, the various shunt resistors do not heat up uniformly since the majority of the magnetic energy is fed into the shunt resistor connected directly across the quenched coil. To minimize the weight of the shunt resistors needed to achieve a limited temperature rise, the resistors can be built as described in U.S. Pat. No. 4,568,908, entitled "Compact Resistor Assembly" issued Feb. 4, 1986. In U.S. Pat. No. 4,568,908 in one embodiment, the shunt resistor sections are electrically isolated but closely thermally coupled. Shunt resistors of this type can be difficult to manufacture due to the thin interplate electrical insulation used to maintain good thermal coupling between the different shunt resistors which can result in electrical shorts between resistors.

It is an object of the present invention to provide a circuit which reduces the heating of the parallel shunt resistor of a quenched coil when a quench occurs.

It is a further object of the present invention to provide a circuit which does not require direct thermal coupling between shunt resistors.

SUMMARY OF THE INVENTION

In one aspect of the present invention, a circuit is provided comprising a plurality of series connected superconductive coils. Each of a plurality of series connected shunt resistors is connected in parallel with at least one corresponding series connected superconductive coil. A superconductive switch, which includes a length of superconductive wire, is connected in parallel with the series connected superconductive coils. The switch further includes a first and second heater means which are thermally coupled to the superconductor wire. The first heater means is connectable to an external power supply. The second heater means has a plurality of different sections with each of the shunt resistors connected in parallel to one of the sections so that a quench in any of the superconductive coils causes a section of the second heater means to warm and drive the superconductive switch normal.

BRIEF DESCRIPTION OF THE DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description taken in conjunction with the accompanying drawing figures in which:

FIG. 2 is a partially cut-away side view of a cylindrical form supporting superconductive coils, shunt resistors and a superconductive switch in accordance with the present invention; and FIG. 3 is a cross-sectional view of a superconductive switch in accordance with the present invention.

DETAILED DESCRIPTION OF THE INVENTION

Figure 1:
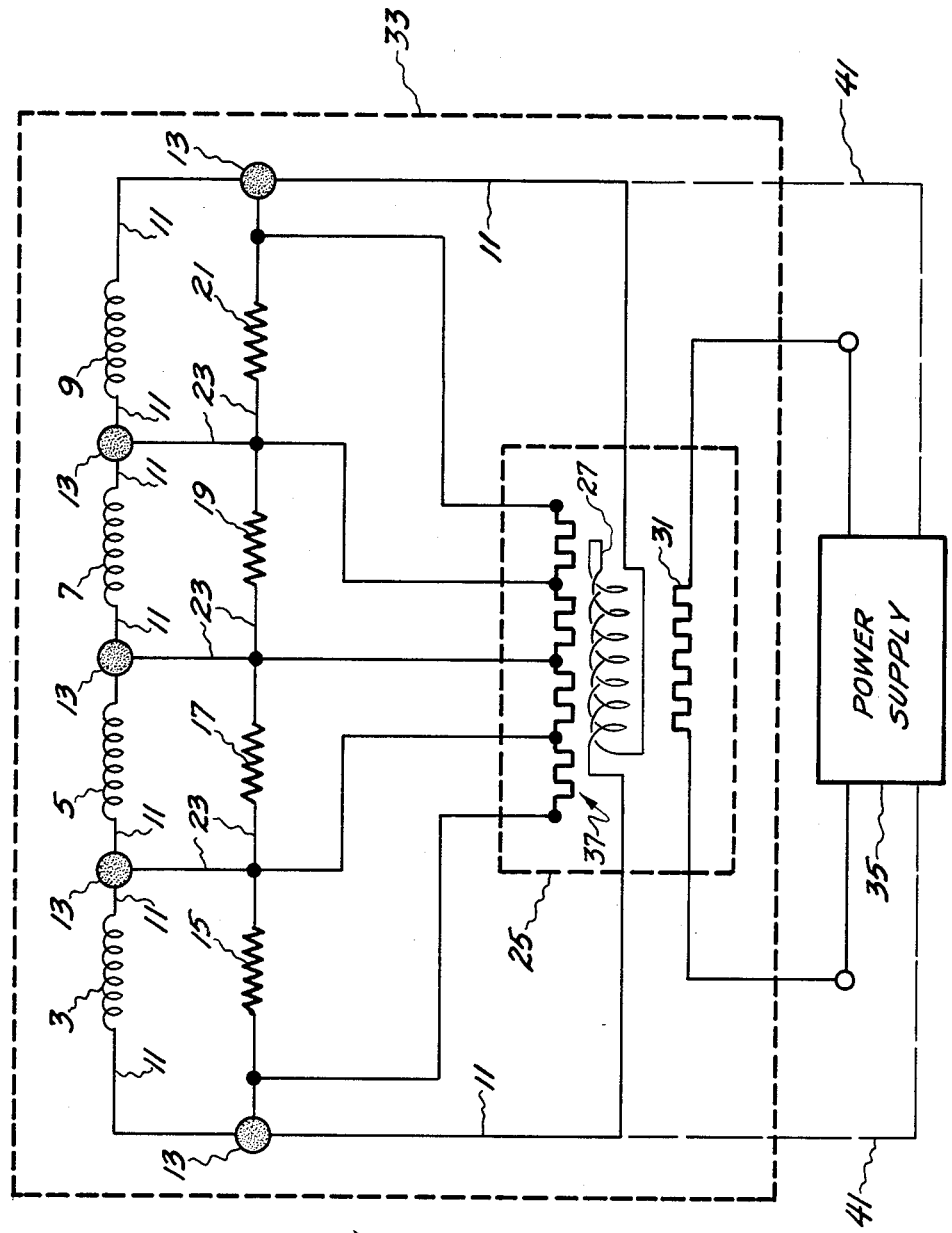
FIG. 1 is a schematic electrical circuit diagram illustrating a typical system employing superconductive coils, shunt resistors and a superconductive switch in accordance with the present invention.

Referring now to the drawing wherein like numerals indicate like elements throughout and more particularly FIG. 1 thereof, a circuit diagram is shown having four superconductive coils 3, 5, 7 and 9 connected in series by superconductive wire 11. The coils can be used, for example, for generating a uniform magnetic field employed in a magnetic resonance magnet. Four coils are shown for illustration purposes with the number of coils used dependent on parameters such as desired magnetic field uniformity. Connections 13 between superconductive wires 11 are made to exhibit zero resistance at the superconductor operating temperatures. Connected in parallel with each of the coils 3, 5, 7 and 9 is a shunt resistor 15, 17, 19 and 21, respectively. The shunt resistors are not fabricated from superconductive material but can be fabricated from, for example, brass sheet. The wires 23 connecting the shunt resistors in the circuit do not have to be superconductive but can comprise copper wire, for example. A superconductive switch 25 is connected in parallel across the series connected coils using superconductive wire 11 and superconductive connections 13. The superconductive switch comprises a length of superconductive wire 27 in close proximity to a control heater 31. The control heater comprises a resistive wire and has leads which extend outside the cryostat envelope 33 where the leads can be connected to an external power source 35. An auxiliary heater 37 comprising resistive wire is also provided in close proximity to the length of superconductor wire 27. The auxiliary heater has tapped connections along its length which connect different portions of the auxiliary heater in parallel with the shunt resistors using nonsuperconductive wire 23. Leads 41 connected across the series connected superconductive coils extend outside a cryostat envelope 33 within which the circuit is situated during operation to attain superconducting characteristics of the superconductor wire. The leads 41 which are not superconductive are used to provide power to the circuit during ramp-up.

Referring now to FIG. 2 a hollow cylindrical form 43 which can be fabricated from fiberglass cloth and resin is shown. Slots have been machined circumferentially around the form and four superconductive windings 3, 5, 7 and 9 are shown wound in the slots. The coils are coaxial and symmetrically arranged around a plane perpendicularly to the axial direction. Situated in other circumferentially extending slots are bifilarly wound shunt resistors 15, 17, 19 and 21. The shunt resistors can comprise sheets of brass 45 with sheets of noncurrent conducting material 47 positioned between adjacent sheets. The ends of the sheets can be crimped over a copper wire 23 and soldered to make lead connections. The copper wire is joined to the superconductive wires using a copper block 49 having slots machined into it. The superconductive wires 11 and copper wires 33 are each soldered into a slot. The superconductive wires 11 extend beyond the block are are joined in a superconductive joint 50 shown symbolically by the crossed wires. The wires leading to the block 51 are sufficiently long to permit moving the block away from the form 43 facilitating the fabrication of the superconductive joint 50. After the superconductive joint has been made the block is mounted on the form. While only one block 49 is shown, blocks are used where necessary to join resistive and superconductor wires.

The superconductive switch 25, which is shown mounted to the form 43, can be fabricated by adding an auxiliary heater to the switch shown in U.S. Pat. No. 4,586,017, filed Sept. 12, 1983 and assigned to the instant assignee. The patent is hereby incorporated by reference. Referring now to FIG. 3, a cross section of the superconductive switch 25 is shown. A heater element coil 31 which can comprise Nichrome wire, is helically wound around a glass fiber/epoxy core 51. The heater element coil 31 is surrounded by a layer of electrically insulating material 53 and an auxiliary heater element coil 55 is wrapped helically around the insulating material. The two heater coils are surrounded by a layer of electrically insulating materials 57 and bifilarly wound superconductive coil 61, which can be epoxy vacuum impregnated. A compressible layer 63, comprising material such as leather or cellulose, surrounds the superconductive coil circumferentially. A thermally insulating sleeve 65 comprising a material such as nylon or polytetrafluoroethylene, surrounds the compressible layer. A metal jacket 67 surrounding the sleeve 65 completes the outer portion of the assembly. Similarly, at each end of the cylindrical superconductive winding an annular ring of compressible material 63 is situated at the end of the superconductive winding followed by discs 71 of insulating material, capped by a disc of metal 73. Apertures are provided in the disc to allow the ends of the superconductive 11 coil to extend outside the housing. Similarly, the ends of the heater and auxiliary heater extend through passageways in the end of the disc. The apertures can be sealed with epoxy after the wires are extended therethrough, if desired. The structure is held together by a bolt 75 and a nut 77. The bolt extends axially through the core and centrally through the metal end discs.

In operation, the cryostat 33 in which the circuit is located is cooled to the temperature required for the superconductive portions of the circuit to operate in the superconducting mode. Power is supplied across the string of superconductive coils from the external power supply 35. Power is also supplied to the heater 31 to keep the superconductive switch normal during the current ramp-up. During current ramp-up the change of current in the superconductive coils causes a voltage to be induced across the coils which in turn causes the sections of the auxiliary heater 37 to heat-up. Since the superconductive switch is already being heated by the control heater and is not supposed to be superconductive during ramp-up, the auxiliary heater operation does not interfere with the start-up procedure.

Once the current in the coils have reached their desired level, a voltage drop no longer occurs across the coils and current is no longer supplied to the auxiliary heater. The power to the control heater 31 is stopped and the power supply connection across the series connected coils removed. Persistent current flows through the loop comprising the superconducting coils and the superconducting switch.

When a quench occurs in any of the superconductive coils, the resistance in the quenched coil rises rapidly and a substantial portion of the steady state current is diverted into the shunt resistor section that is in parallel with the quenched coil. A fraction of this current is also shunted through a tapped section of the auxiliary heater of the superconducting switch. The values of the tapped auxiliary heater sections are chosen such that the superconductive switch is forced to go normal due to the current flow in one of the tapped sections. When the superconductive switch goes normal, current flow in all the coils decreases and the power dissipation is distributed among the shunt resistors and shared by the superconductive switch and thus the magnetic field energy is relatively uniformly distributed among the several shunt resistor sections without the necessity of thermal conduction between the shunt resistors. There will be a minimum value of initial current for which the superconducting switch will go normal but at this minimum current level the energy to be dissipated by the shunt resistor in parallel with the quenched coil is also low.

The foregoing has described a superconductive circuit for controlling quench events which reduces the heating of the parallel shunt resistor of a quenched coil when a quench occurs.

While the invention has been described with respect to a preferred embodiment thereof, it will be apparent that certain modification and changes can be made without departing from the spirit and the scope of the invention. It is therefore to be understood that the appended claims are intended to cover all such modifications and changes as fall within the true spirit of the invention.

What is claimed is:
1. A circuit comprising:
a plurality of series connected superconductive coils;

a plurality of series connected shunt resistors, each of said shunt resistors connected in parallel with at least one corresponding series connected superconductive coil; and a superconductive switch including a length of superconductive wire connected in parallel with said series connected superconductive coils, and first and second heater means thermally coupled to said superconductive wire, said first heater means connectable to an external power supply, said second heater means having a plurality of different sections, each of said shunt resistors connected in parallel to one of said sections, so that a quench in any of the superconductive coils causes a section of said second heater means to warm and drive said superconductive switch normal.

2. The circuit of claim 1 wherein said coils are coaxial with one another and arranged symmetrically about a plane perpendicular to the axial direction.

3. The circuit of claim 1 wherein said shunt resistors each comprise bifilarly wound sheets of ohmic resistive material, thermally isolated from one another.

* * * * *